(12) United States Patent
Jefferson (10) Patent No.: US 7,791,441 B1
(45) Date of Patent: Sep. 7, 2010

(54) MAGNETICALLY POWERED SPINNING MAGNET

(76) Inventor: George F. Jefferson, 115 Firefly La., Round-O, SC (US) 29474

( * ) Notice: Subject to any disclaimer, the term of this patent is extended or adjusted under 35 U.S.C. 154(b) by 56 days.

(21) Appl. No.: 12/103,050

(22) Filed: Apr. 15, 2008

(51) Int. Cl.
  *H01F 7/02* (2006.01)
  *B01F 13/08* (2006.01)
(52) U.S. Cl. ...................... 335/306; 366/273
(58) Field of Classification Search .............. 335/306; 366/273–274
  See application file for complete search history.

(56) References Cited

U.S. PATENT DOCUMENTS

| | | | |
|---|---|---|---|
| 3,356,346 A * | 12/1967 | Landsberger | ............... 366/274 |
| 3,730,488 A * | 5/1973 | Gardner, Jr. | ................. 366/262 |
| 3,997,272 A * | 12/1976 | George | ....................... 356/246 |
| 4,090,263 A * | 5/1978 | Hoffa | ......................... 366/273 |
| 4,486,729 A | 12/1984 | Lee | |
| 4,568,195 A * | 2/1986 | Herz et al. | .................. 366/274 |
| 4,643,034 A | 2/1987 | Favatella | |
| 4,673,369 A | 6/1987 | DiPietro | |
| 4,728,871 A | 3/1988 | Andrews | |
| 5,135,425 A | 8/1992 | Andrews et al. | |
| 5,182,533 A | 1/1993 | Ritts | |
| 5,506,459 A * | 4/1996 | Ritts | ......................... 310/90.5 |
| 5,533,800 A * | 7/1996 | Stiegelmann et al. | ....... 366/142 |
| 5,985,535 A * | 11/1999 | Urabe | ......................... 430/569 |
| 6,176,609 B1 * | 1/2001 | Cleveland et al. | ........... 366/273 |
| 6,218,751 B1 * | 4/2001 | Bohlin | ....................... 310/90.5 |
| 6,332,706 B1 * | 12/2001 | Hall | ........................... 366/274 |
| 6,464,387 B1 * | 10/2002 | Stogsdill | ..................... 366/273 |
| 6,781,270 B2 | 8/2004 | Long | |
| 6,873,235 B2 | 3/2005 | Fiske et al. | |
| 2005/0168086 A1 | 8/2005 | Tamaki | |
| 2005/0286342 A1 * | 12/2005 | Garcia et al. | ................ 366/273 |
| 2006/0126429 A1 * | 6/2006 | Coville et al. | ............... 366/273 |

* cited by examiner

*Primary Examiner*—Lincoln Donovan
*Assistant Examiner*—Alexander Talpalatskiy
(74) *Attorney, Agent, or Firm*—B. Craig Killough (57) ABSTRACT

A magnetic field is generated by a magnetic field that is rotated axially. A second magnet spins in response to the rotating magnetic field generated by the axial rotation of the first magnetic field. The second magnet is remote from and is not physically connected to the first magnetic field. The spin or rotation of the second magnet is responsive to the rotation of the first magnetic field by the interaction of the respective magnetic fields.

17 Claims, 15 Drawing Sheets

MAGNETICALLY POWERED SPINNING MAGNET

FIELD OF THE INVENTION

This invention relates to rotating or twisting magnetic fields generally, and is more specifically directed to a magnetically powered spinning magnet.

SUMMARY OF THE INVENTION

A first magnetic field is generated and rotated axially. A second magnet 26 spins and rolls in response to the first rotating magnetic field, which may be generated by the axial rotation of a first magnet. The spin and roll, or rotation, of the second magnet is responsive to the rotation of the first magnetic field by the interaction of the magnetic fields.

The second magnet is remote from the first magnetic field. The second magnet is not physically connected to the first magnet or other means of producing a first magnetic field. This device may be useful in the study of the dynamics of rotating magnetic fields and spinning discs, or used in nanotechnology, gyroscopes, flywheel technology or electricity generation. It can also be adapted for use by children as a toy or a simple novelty item.

DESCRIPTION OF THE DRAWINGS

FIG. 23 shows an auxiliary shaft attached to the underside of the capture ring and the surface the second magnet spins/rolls on.

DESCRIPTION OF THE PREFERRED EMBODIMENTS

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I believe is the best mode of carrying out the invention.

Figure 1:
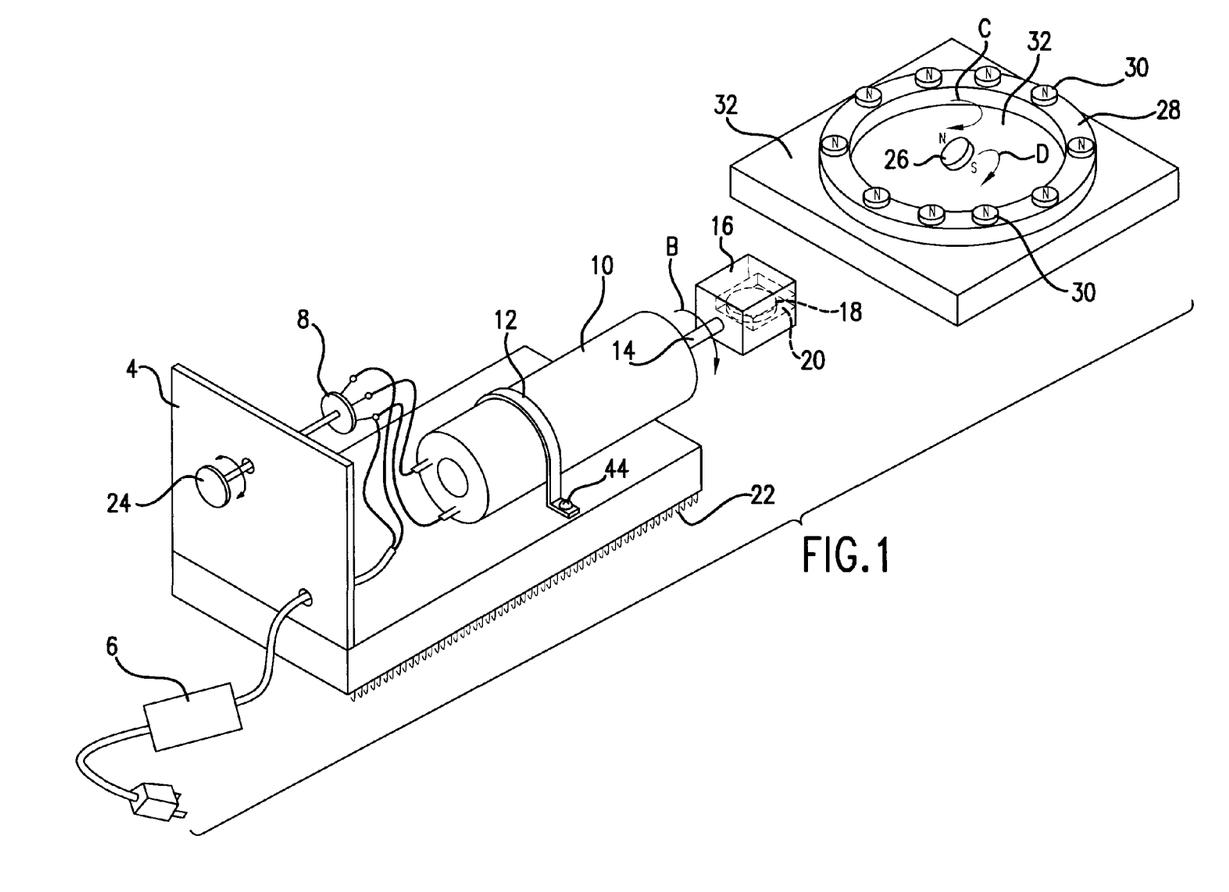
FIG. 1 is a perspective view of an embodiment of the present invention.
Figure 2:
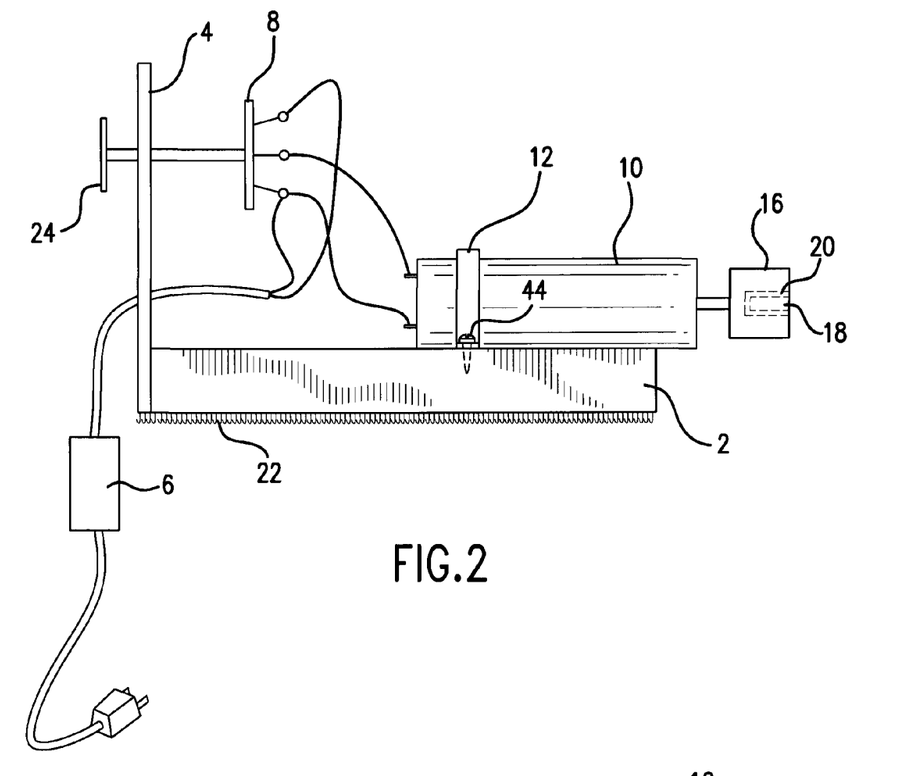
FIG. 2 is an elevation of an embodiment of the first magnet of the present invention.

Referring now to the drawing figures, a magnetically powered spinning magnet apparatus constructed in accordance with one embodiment of the present invention is indicated generally in FIGS. 1 and 2. As shown in FIG. 1, the magnetically powered spinning magnet apparatus comprises a motor base 2. The base may comprise wood or other non-magnetic material, and an upstanding end wall 4, disposed integral at one end of the motor base 2. The end wall 4 may also be made of wood or other non-magnetic material. A fastener, such as hook and loop material 22 may be attached to the bottom of the motor base 2 to hold the base in place and prohibit the base from moving. Axial rotation of the first magnet 18 may be provided by a shaft 14 of an electric motor 10, which is secured to the motor base 2 by means of a non-magnetic strap 12. The strap 12 is placed over the motor and may be secured to the motor base 2 by means of non-magnetic screws 44.

Figure 3:
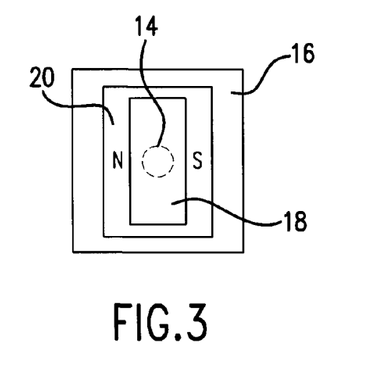
FIG. 3 is a front view of an embodiment of the first magnet contained within a receptacle.
Figure 4:
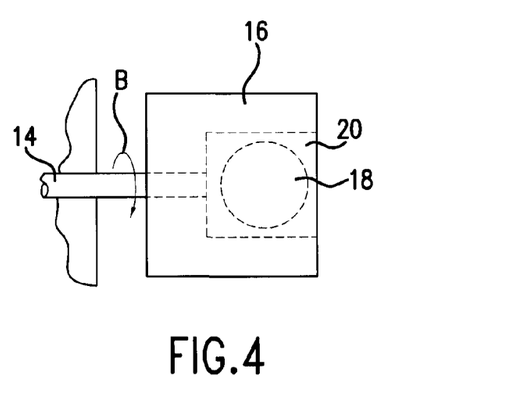
FIG. 4 is a side view of the first magnet container with the first magnet situated within the receptacle.

A first magnet container 16 may be removably attached to the shaft 14 of the motor 10 so that a first magnet 18 can be inserted axially into the first magnet container receptacle 20. The first magnet container 16 is preferred to be non-magnetic. The first magnet 18 is preferred to be an axially magnetized disc magnet having a first side with north (N) polarity and a second side with south (S) polarity. The electric motor may be a direct current motor. The speed of rotation of the electric motor may be controlled by a rheostat 8 or similar speed control device. The direct current motor may be powered by batteries or by alternating current (AC) with an AC adapter 6 or similar device. An electronic circuit may be used to allow the motor 10 to be reversed so that shaft 14 turns in both a clockwise and a counter-clockwise direction. An electronic circuit may be used to maintain rotation of the shaft 14 of the electric motor 14 at a constant speed under various loads. Other rotational means could be used, including manually operated means, alternating current electric motors, engines or other similar devices.

A second magnet 26 is positioned remotely from the first magnet 18 within a capture ring 28. The second magnet is preferred to be an axially magnetized disc magnet. The second magnet has a first side with north (N) polarity, and a second side with south (S) polarity.

The second magnet is not physically attached to the first magnet. Other than the influence of the magnetic field from the first magnet 18 and the second magnet 26, there is no connection or communication between the first magnet and the second magnet, and none is required for the first magnet to cause continued spin and roll of the second magnet. In this embodiment, the second magnet is not attached to the surface 32 upon which the second magnet spins and rolls. The second magnet may be spun on various planes that are different than the plane on which the first magnet spins.

Figure 5:
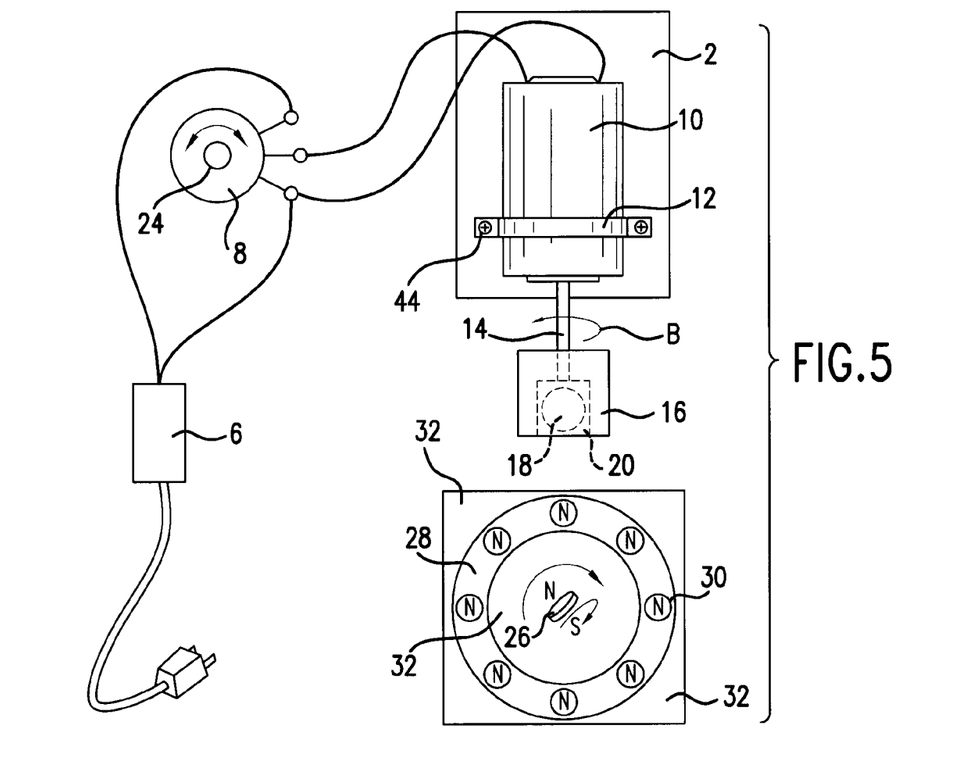
FIG. 5 is a top plan view of a preferred embodiment of the present invention.
Figure 6:
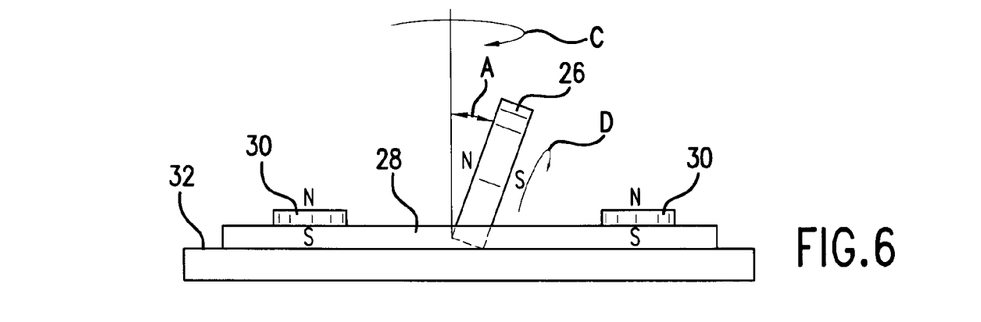
FIG. 6 is an elevation showing the second magnet, at an angle spinning on its axis on a base within a capture ring.

In use, according to the embodiments shown in FIG. 5 and FIG. 6, the motor 10 is actuated at a slow speed utilizing the knob 24 of the rheostat 8, to cause power shaft 14 of the motor to rotate. As the shaft rotates, the first magnet container 16 rotates and causes the first magnet 18 to rotate axially in the same direction as the shaft, which is a counter-clockwise direction as shown in FIG. 5 and FIG. 6.

First magnet 18 may also be attached to the end of the shaft 14 without the use of container 16. The shaft 14 and the first magnet 18 may be made as a single or unitary structure. An array of magnets may be assembled together as a single unit to increase the magnetic torque delivered to the second magnet.

With the first magnet rotating axially in a counter-clockwise direction as shown in FIG. 5, a dynamic, or twisting or rotating, magnetic field is generated. As a result of this twisting magnetic field, spinning/rolling of the second magnet 26 is initiated at a slow speed.

In the embodiment shown in FIG. 5, the spinning/rolling action of the second magnet may be initiated manually at a slow speed by spinning the second magnet with the north (N) polarity of the second magnet slightly tilted or facing upward, so that the second magnet 26 spins on its own axis and rolls about its edge on the surface 32 as shown in FIG. 6. After manual startup of the second magnet 26, the first magnet 18 maintains the spinning action of the second magnet. Control of the rotational speed of the first magnet is obtained in this embodiment by manipulating knob 24. Increasing the speed of motor 10 increases the rotational speed of the first magnet, which increases rate of spin and roll of the second magnet 26.

The second magnet may be encapsulated in a hard material to prevent wear during the spin and roll. The direction of rotation of the first magnet 18 in FIG. 5 may also be clockwise, however counter-clockwise may result in a more stable spin. The direction of spin/roll of the second magnet when viewed from above is clockwise as shown in FIG. 6. It is believed that the magnetic fields of both the first magnet and the second magnet are intertwined, because of their proximity to one another, and in that axial rotation of the first magnet 18 appears to generate a twisting or rotating magnetic field that spins/rolls the second magnet 26.

The second magnet 26 may be of greater volume, weight and magnetic field strength than the first magnet 18. This will increase the torque of the second magnet whereby the second magnet may be used to spin other devices or perform other work.

Figure 9:
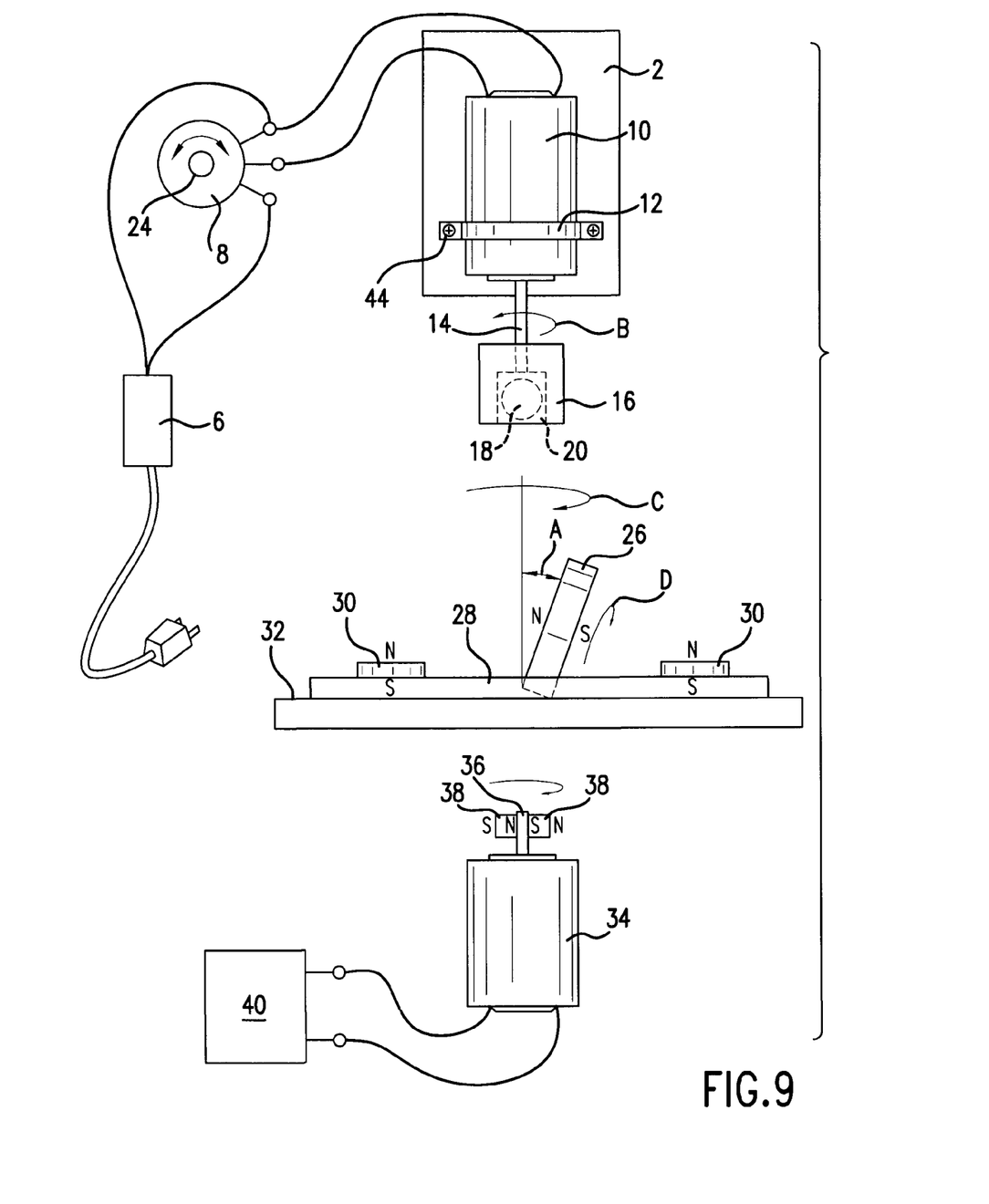
FIG. 9 is demonstrative of another embodiment of the present invention showing a second magnet remotely operating a motor/generator by magnetic coupling to the motor/generator magnets.
Figure 10A:
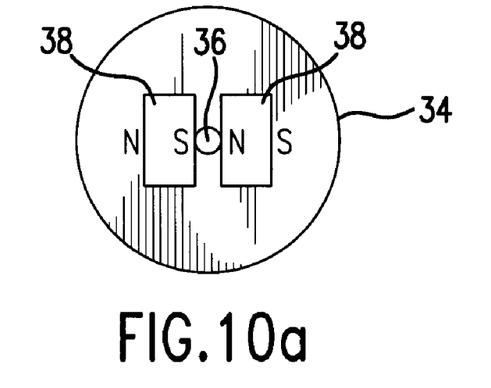
FIG. 10a is an elevation of an embodiment of the motor/generator magnets.
Figure 10B:
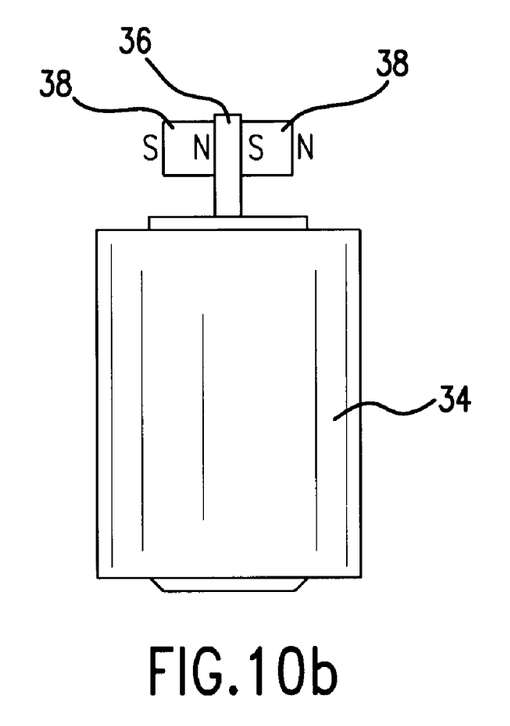
FIG. 10b is a top plan view of an embodiment of the motor/generator magnets.

In another embodiment shown in FIG. 9, a second magnet 26, that is preferred to be larger than the first magnet in volume and mass, is started manually spinning and rolling in the same manner as discussed in the preferred embodiment shown in FIG. 5 and FIG. 6. A motor/generator 34 is positioned a distance beneath the second magnet 26 and the surface 32. As shown in FIG. 9, and FIG. 10, a plurality of motor/generator magnets 38 are mounted on either side of the shaft 36 of motor/generator 34. The second magnet 26 becomes magnetically coupled to the motor/generator magnets 38, thereby rotating the shaft 36 of motor/generator 24 and registering a positive (+) charge on the voltmeter 40. When a larger second magnet 26 is spun by a smaller first magnet 18, it requires a greater force to stop rotation of the second magnet than is required to stop the first magnet. It is believed that this is due to the larger mass and momentum of the second magnet in relation to the first magnet. Once the larger second magnet 26 is in motion, the second magnet's momentum requires very little input from the rotating magnetic fields of the first magnet 18 to keep it spinning. It is believed that the momentum resulting from the larger mass of the second magnet causes the second magnet to continue rotation with a weaker magnetic force from the first magnet.

Figures 11, 12:
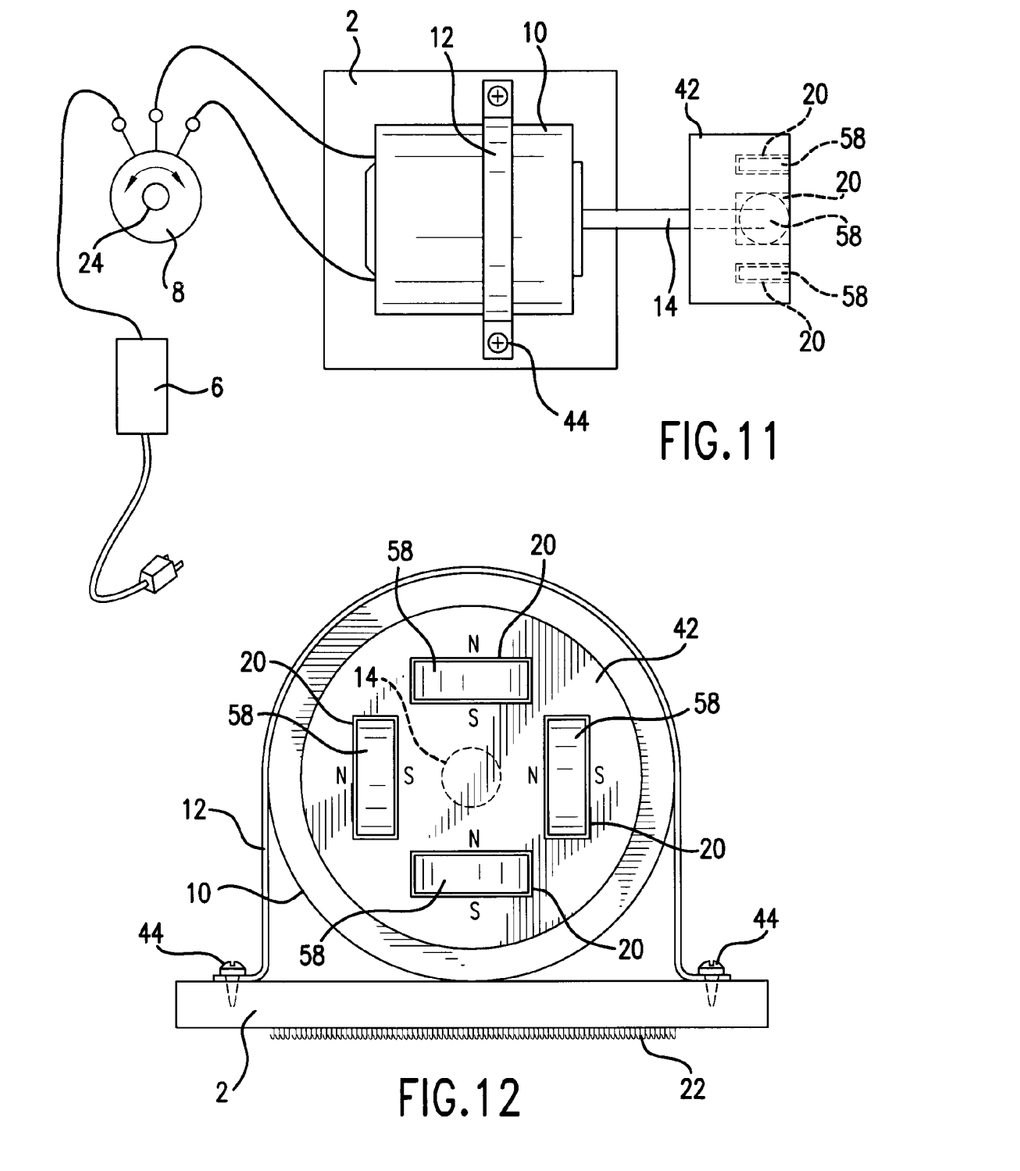
FIG. 11 is a top plan view of an isolation of a rotational device and multiple first magnet container.
FIG. 12 is a front elevation of an isolation of a rotational device and multiple first magnet container.

In another embodiment as shown in FIGS. 11 and 12, a multiple magnet container 42 with multiple receptacles 20, may be removably attached to shaft 14 of motor 10. Magnets of various sizes, configurations and field strengths may be inserted or removed manually in the receptacles 20. In the embodiment of FIGS. 11 and 12, the quad magnets 58 may be axially magnetized, and are situated whereby they revolve around the shaft 14 of motor 10, instead of rotating axially as first magnet 18. The movement of quad magnets 58 as they revolve around shaft 14 of motor 10 create an environment that causes, the second magnet 26 to spin at a greater distance from the first magnet 18 than the use of fewer magnets.

Rotation of the first magnet 18 in appropriate proximity to the second magnet 26 causes the second magnet to continue to spin and roll as long as the first magnet continues to rotate. No additional energy input is required. The second magnet will spin and roll about its axis as shown in FIG. 6, and preferably on a relatively flat surface 32, for as long as the first magnet 18 in FIG. 5 continues to rotate counter clockwise or clockwise. To maximize performance of the second magnet, the surface 32 may be made of glass or other hard material having a smooth surface of relatively low friction. The second magnet 26 rotates at an angle from almost vertical, as demonstrated by angle $\alpha$ in FIG. 6. Angle $\alpha$ will typically be 18° to 22°, but may be greater depending on the rotational speed of the first magnet 18.

Figure 7:
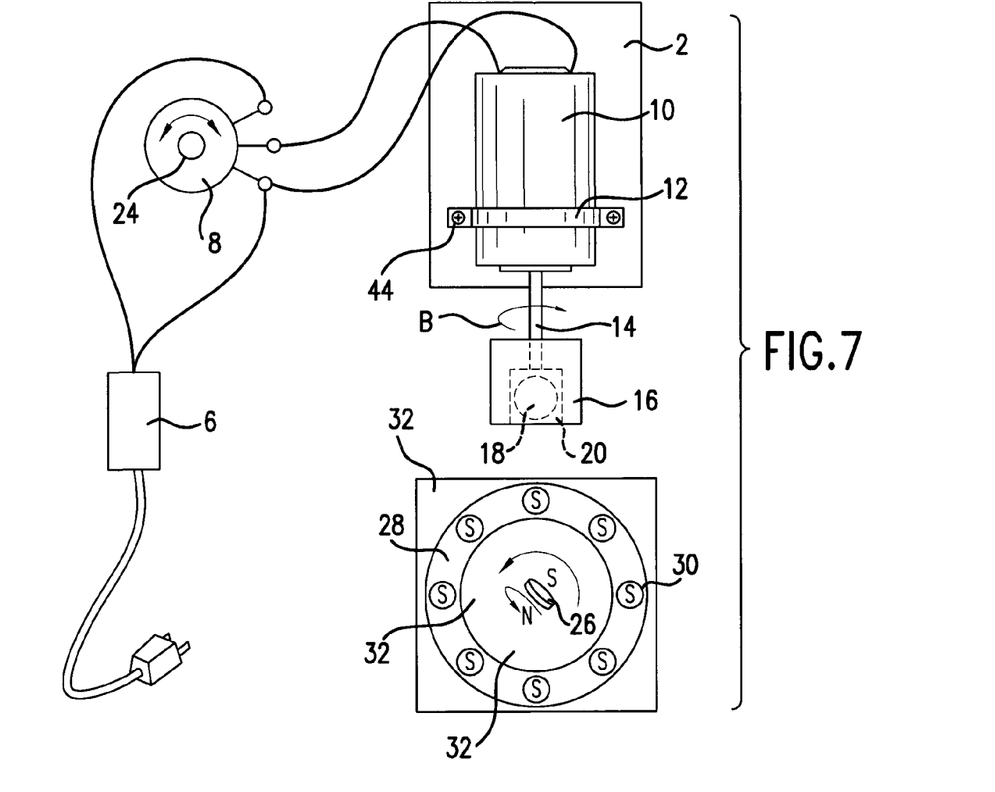
FIG. 7 is a top plan view of an embodiment of the present invention, showing rotation of the first magnet container in the opposite direction from the direction shown in FIG. 5.
Figure 8:
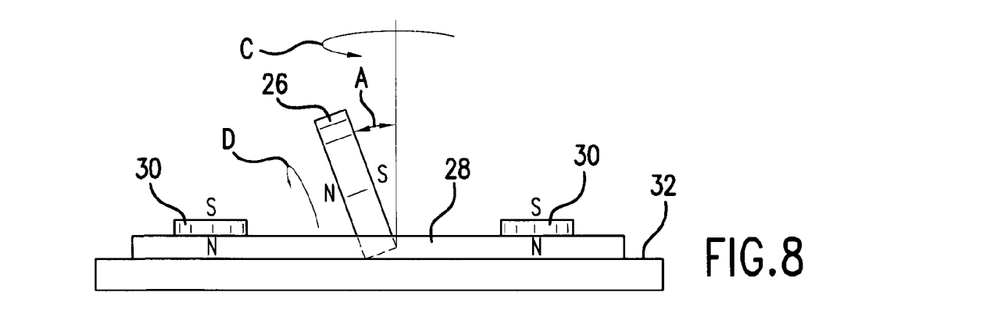
FIG. 8 is an elevation showing the second magnet, at an angle spinning on its axis on a base within a capture ring in a direction of rotation that is opposite the direction shown in FIG. 6.

The second magnet 26 will also spin and roll in a counter clockwise direction, as it also rolls. Spinning of the second magnet in a counter clockwise direction is achieved by rotation of the first magnet 18 in a clockwise rotation as shown in FIG. 7 and indicated by the arrow (B) or a counter-clockwise rotation. Rotation of the first magnet 18 is initiated by actuating the motor in a clockwise direction of rotation as shown in FIG. 7 so as to rotate the first magnet axially in a clockwise direction. Spinning of the second magnet 26 in a counter clockwise direction is initiated by some means, such as by manually beginning the spin of the second magnet counter clockwise, preferably with the south (S) polarity slightly tilted or facing upward so that the disc magnet spins about its axis as shown in FIG. 8. The second magnet will continue to spin in a counter clockwise direction as long as the first magnet continues to rotate either clockwise as shown in FIG. 7 or counter clockwise and as long as the second magnet is in proximity to the first magnet. The second magnet 26 also rolls in a counter-clockwise direction as indicated by the arrow (D) in FIG. 8. As demonstrated in FIG. 8, the second magnet will lean or tilt at angle $\alpha$ as it spins and rolls, and this angle ranges from 18° to 22°. The angle of inclination of the second magnet may be controlled by the rotational speed of the first magnet 18 by turning the knob 24 of the rheostat 6 to a slower or faster speed.

Figure 13:
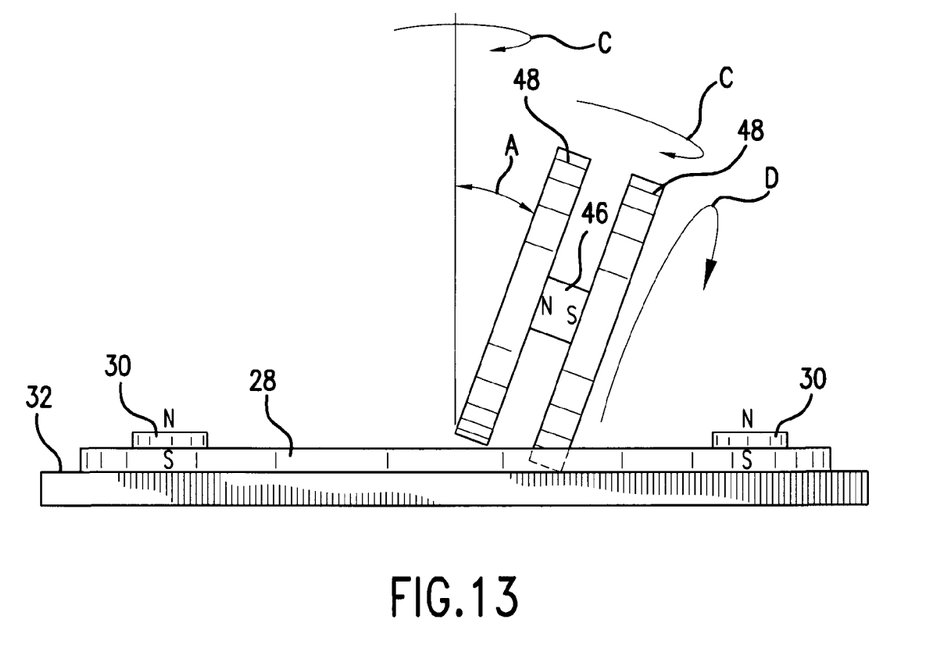
FIG. 13 is an elevation of another embodiment of a spinning disc within a capture ring.
Figure 14:
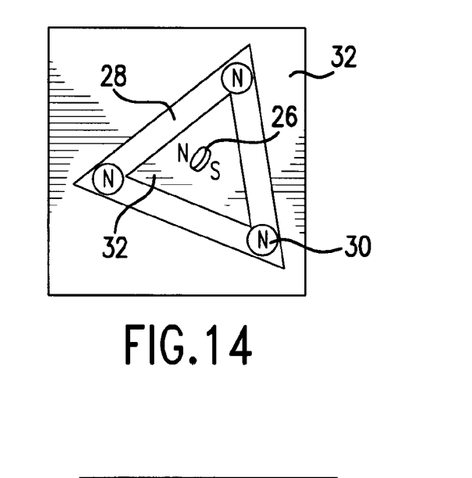
FIGS. 14, 15, 16, 17 show various embodiments of capture rings.

In another embodiment of the present invention a third disc magnet 46 as shown in FIG. 13, may be secured between two circular non-magnetic disc plates 48 with one edge of the south (S) oriented plate contacting the surface 32 while spinning and rolling on its own axis. In this embodiment, the second magnet 26 does not directly come into contact with surface 32. This allows the second magnet to be used as a vehicle to spin other devices. Sanding blades may be substituted for the disc plates 48. The sanding blades may be used to grind into a surface. Another use places the second magnet 26 within the gimbals of a gyroscope.

The second magnet 26, when spinning/rolling, is magnetically tethered to the first magnet 18 while positioned a distance from the first magnet by the interaction of their twisting or rotating magnetic fields. It is believed that the magnetic fields are weaved together. It is further believed that this tethering results from the fields being weaved together, and during operation neither the first magnet 18 nor the second magnet 26 know whether to attract one another or repel one another because they are in motion, spinning axially and are "confused." However, I do not wish to be bound by this opinion. Wherever the first magnet 18 is moved, the second magnet 26 will follow, presuming a capture ring or similar limiting device is not used. If the first magnet 18 is brought too close to the second magnet 26, the second magnet will move away but will stay tethered from a distance to the first magnet. Sometimes this tether terminates; one possible cause may be the effects of gravity or too much tilt in the surface 32 or rotational speed of the first magnet. When the tether is broken, the second magnet 26 as it spins and rolls, will have a tendency to move or "walk" across the surface 32 on which it spins and rolls. Because of this tethering quality and the tendency of the second magnet to wander, if the tether is cut, a limiting device may be employed.

In one embodiment, the limiting device is a capture ring. The capture ring 28, as shown in FIGS. 5 and 6, is a ring having a series of axially magnetized magnets 30, which may be disc magnets, positioned near the periphery of the ring. The polarity orientation of the peripheral magnets 30 depend on whether the second magnet 26 is started manually or mechanically spinning with the north (N) polarity tilted or facing up or the south (S) polarity tilted or facing up. In FIG. 7 and FIG. 8 the polarity orientation of the peripheral magnets 30 are south (S) polarity facing up because the second magnet is started spinning with the south (S) polarity tilted or facing up. In FIGS. 5 and 6 the capture ring 28 has a north (N) polarity because the second magnet 26 is started spinning with its north (N) polarity tilted or facing up. The capture ring may be constructed in various configurations and numbers of magnets as shown in FIGS. 14, 15, 16, and 17, or it may be made of coils of wire that produce magnetic fields.

Figure 15:
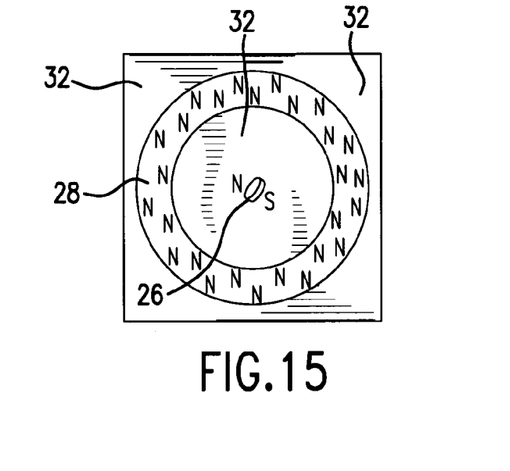
Figure 16:
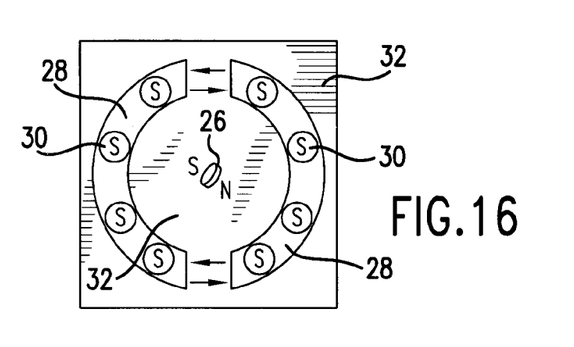
Figure 17:
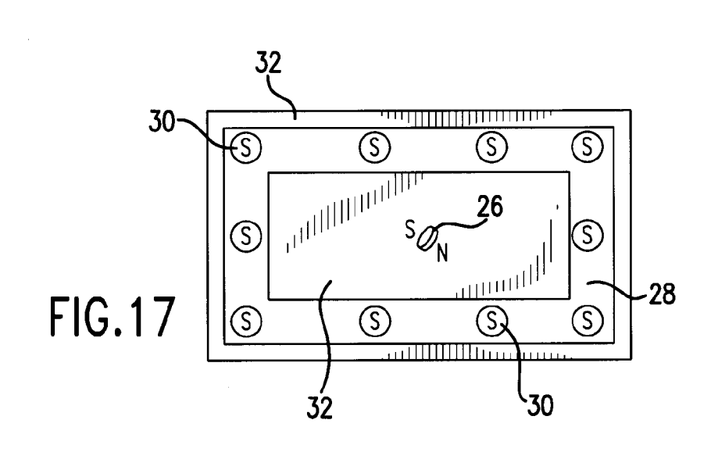
Figure 18:
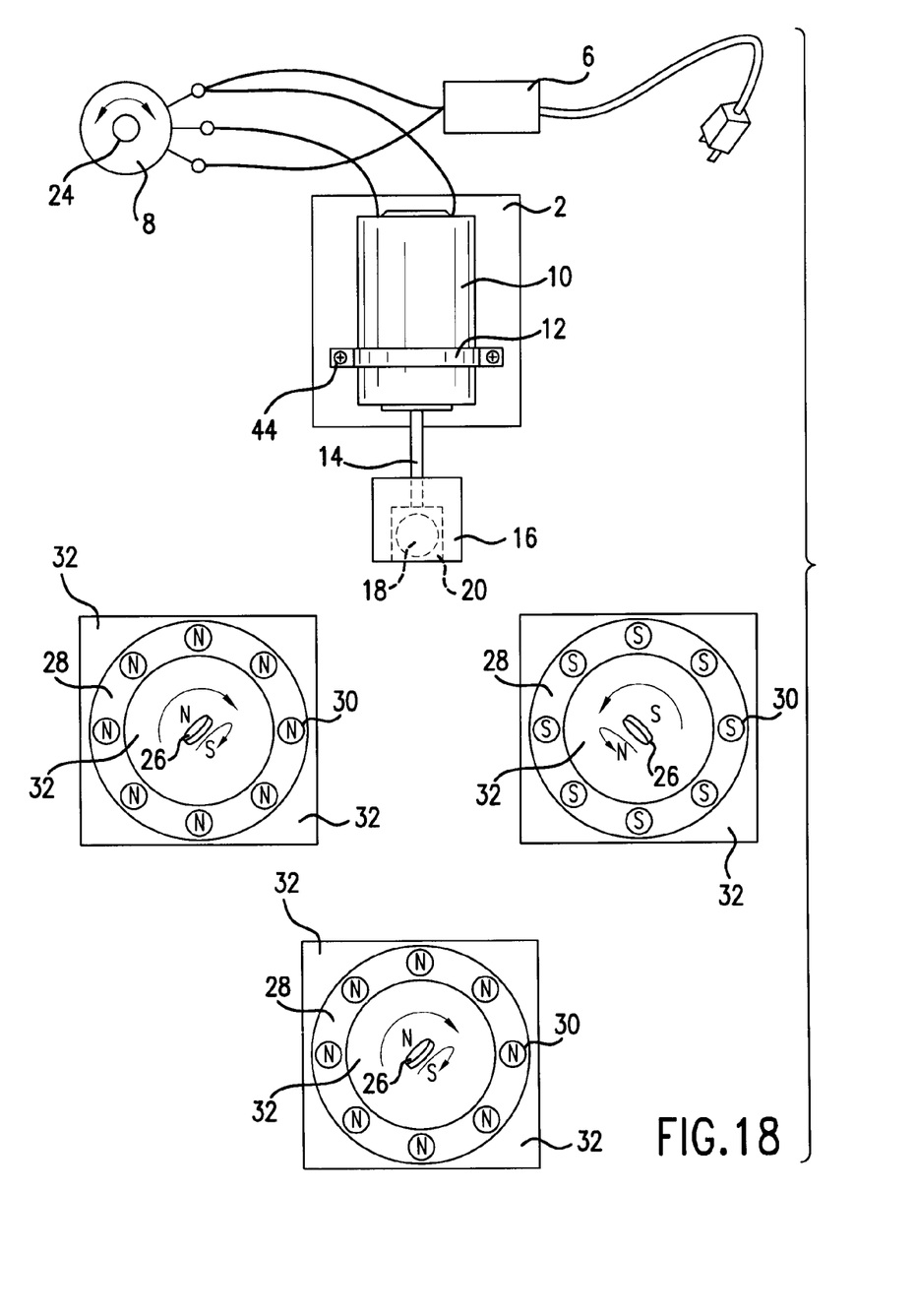
FIG. 18 is a top plan view of an embodiment showing multiple magnetic disc spinning within multiple capture rings that are responsive to a single first magnet.

In another embodiment shown in FIG. 15, the capture ring 28 may be a single ring magnet, magnetized axially. The capture ring 28 with the second magnet 26 spinning and rolling within the ring may be free to move about the surface 32 by manually moving the ring about. The capture ring also allows for the second magnet 26 to be moved a distance from the first magnet 18 so that multiple capture rings may be employed to spin multiple second magnets as shown in FIG. 18.

It may be necessary to initiate spinning of the second magnet 26 without the capture ring. It is then possible to capture the second magnet to relocate it. This is done with the use of a capture ring as shown in another embodiment in FIG. 16. The second magnet 26 is started spinning manually and the two halves of the capture ring are gradually brought together as shown, capturing the second magnet 26.

As shown in FIGS. 5 and 6, the second magnet will spin and roll on its axis in substantially the center of the ring having a plurality of evenly spaced magnets about the periphery, and the second magnet will not materially walk from the center of the ring.

As mentioned above, a second magnet 26 is tethered and held in place by the first magnet, by a spinning or rotating magnetic field, or the second magnet may be held in place by magnetic forces supplied by a capture ring 28. A second magnet 26 as it spins on its own axis is also rolling on its edge as indicated by arrow (D) in FIGS. 6 and 8.

The roll of the second magnet may produce a tapping sound as it rolls across the surface 32. This sound may be distracting and may be eliminated. A capture ring's peripheral magnets 30 may be of sufficient strength to stop the second magnet from rolling as it continues to spin on its axis. The peripheral magnets 30 may also be brought closer to the center of the ring as the second magnet is spinning to stop the roll of the second magnet.

Figure 19:
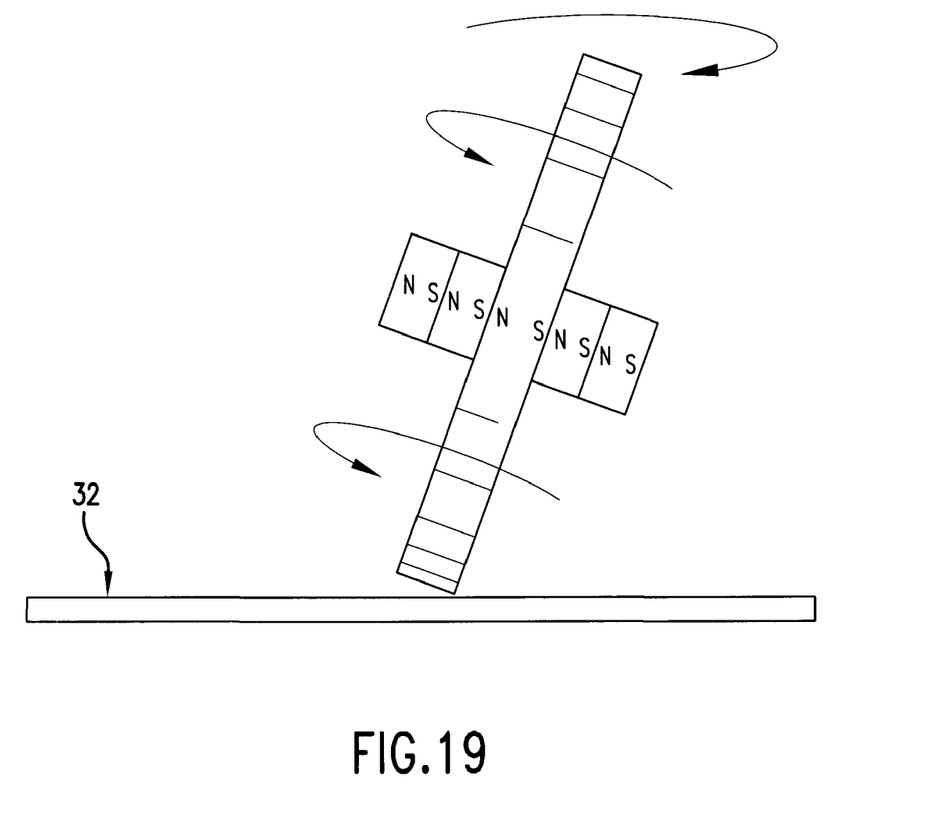
FIG. 19 is an elevation view of another embodiment of a spinning magnetic disc that has no roll associated with it.

In another embodiment, the second magnet 26 may also be configured to spin without rolling and without the use of a capture ring 28, as shown in FIG. 19. In this embodiment of the second magnet 26, four smaller disc magnets 52 are placed near a center of the fifth disc magnet 50, with two of the smaller magnets on either side of the larger magnet. A second magnet may be constructed with the proper field orientation to eliminate roll without the additional four, fifth disc magnets 52.

The tilt or angle of inclination of the second magnet 26 may also be decreased by the configuration of the second magnet as shown in FIG. 19 or by stronger magnetic fields in the peripheral magnets 30 of the capture ring. The rotational speed of the first magnet 18 may also be used to stop the roll and decrease the angle of tilt of the second magnet 26.

Figure 20:
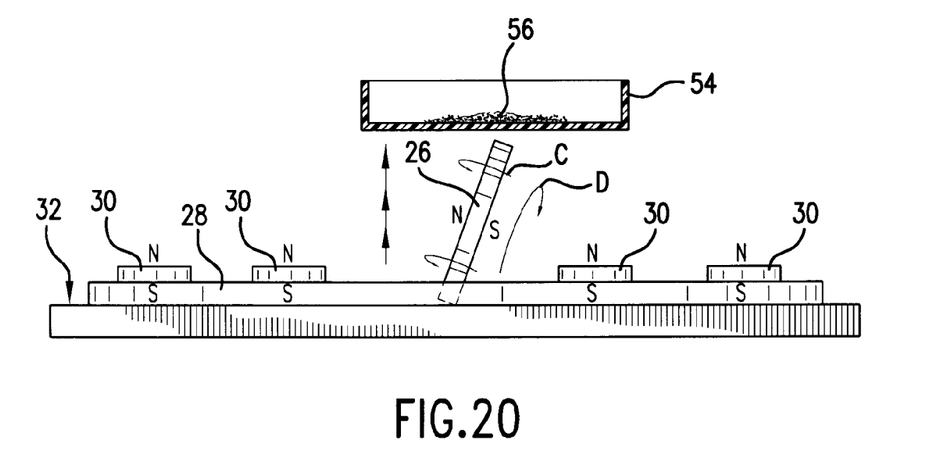
FIG. 20 is another embodiment of the present invention showing a vessel containing magnetically attracted material being lowered to retrieve a second magnet.
Figure 21:
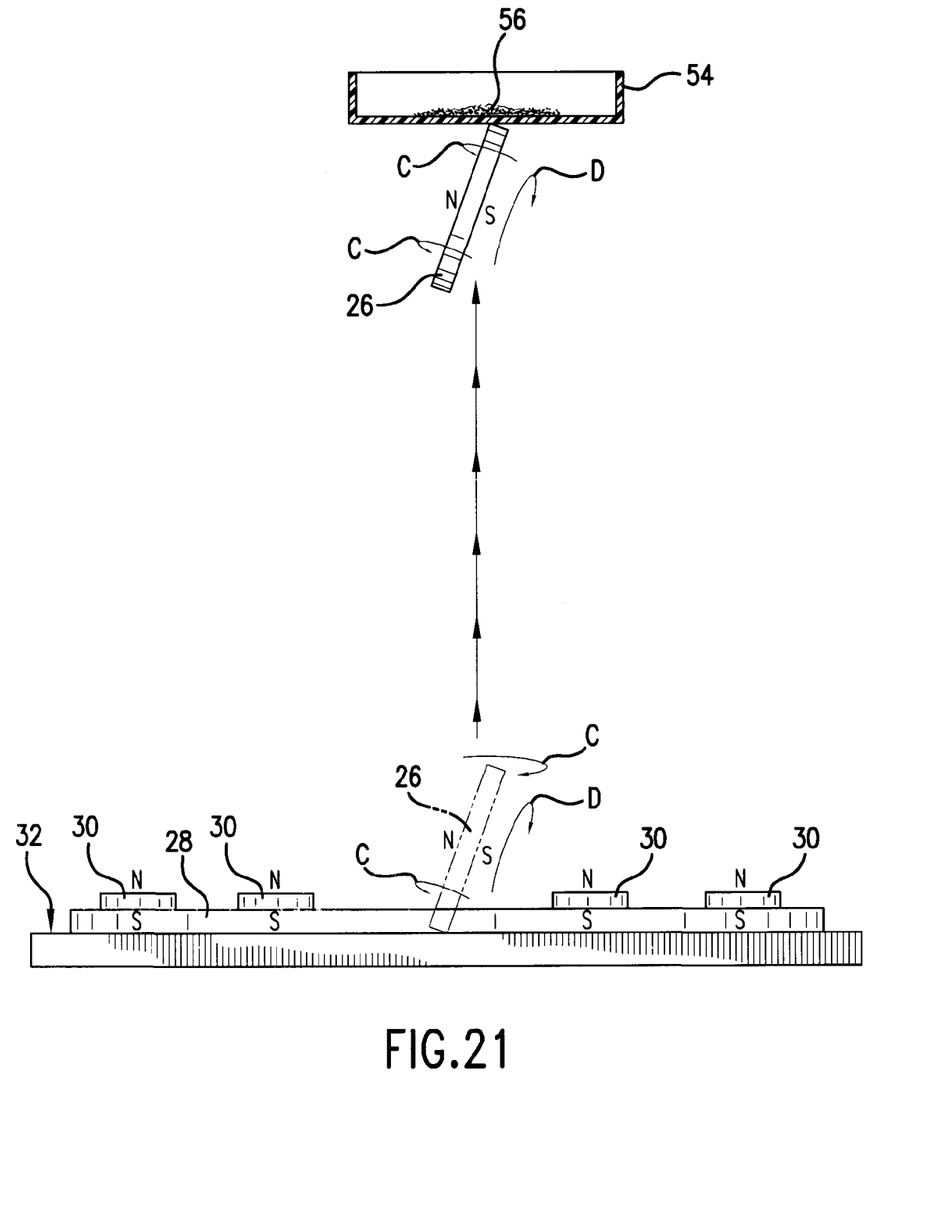
FIG. 21 shows the retrieval and ascension of the second magnet of FIG. 20 from within a capture ring.
Figure 22:
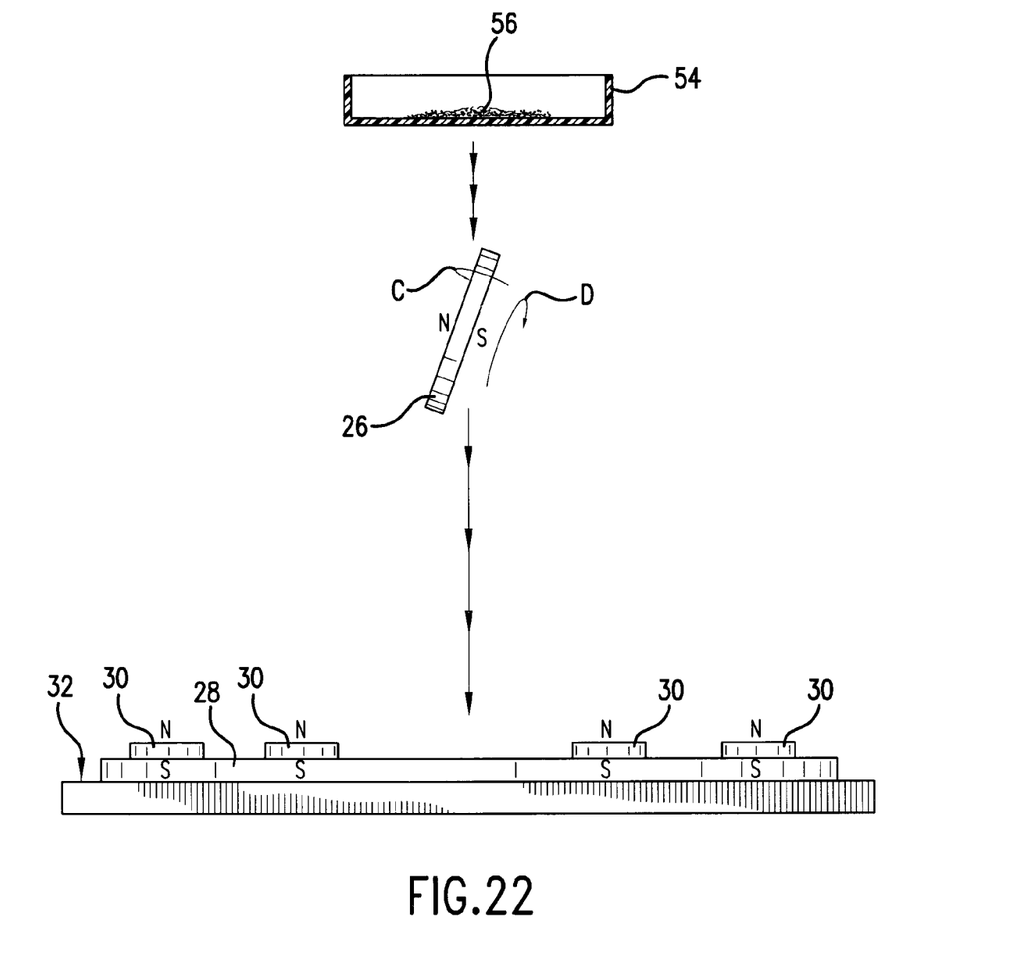
FIG. 22 shows the second magnet descending from the bottom of the vessel.

In another embodiment of the present invention as shown in FIG. 20, a second magnet 26, is spinning/rolling within a capture ring 28. A vessel 54, containing magnetically attractive material 56 is lowered over the top of the second magnet 26. The second magnet is attracted to the material 56, and the second magnet attaches itself to the bottom of the vessel 54. The second magnet 26 may be lifted a distance above the capture ring as shown in FIG. 21. Tapping on the top of the vessel 54 releases the second magnet 26, which descends back down to within the capture ring 28 as shown in FIG. 22. As mentioned in the present description, the second magnet 26 is tethered to the first magnet 18. This tether allows for the second magnet to maintain its equilibrium while it leaves the bottom of the vessel 54 and lands within the capture ring 28 onto the surface 32, continuously maintaining spin/roll as indicated by the arrows (C) and (D) in FIG. 22.

Figure 23:
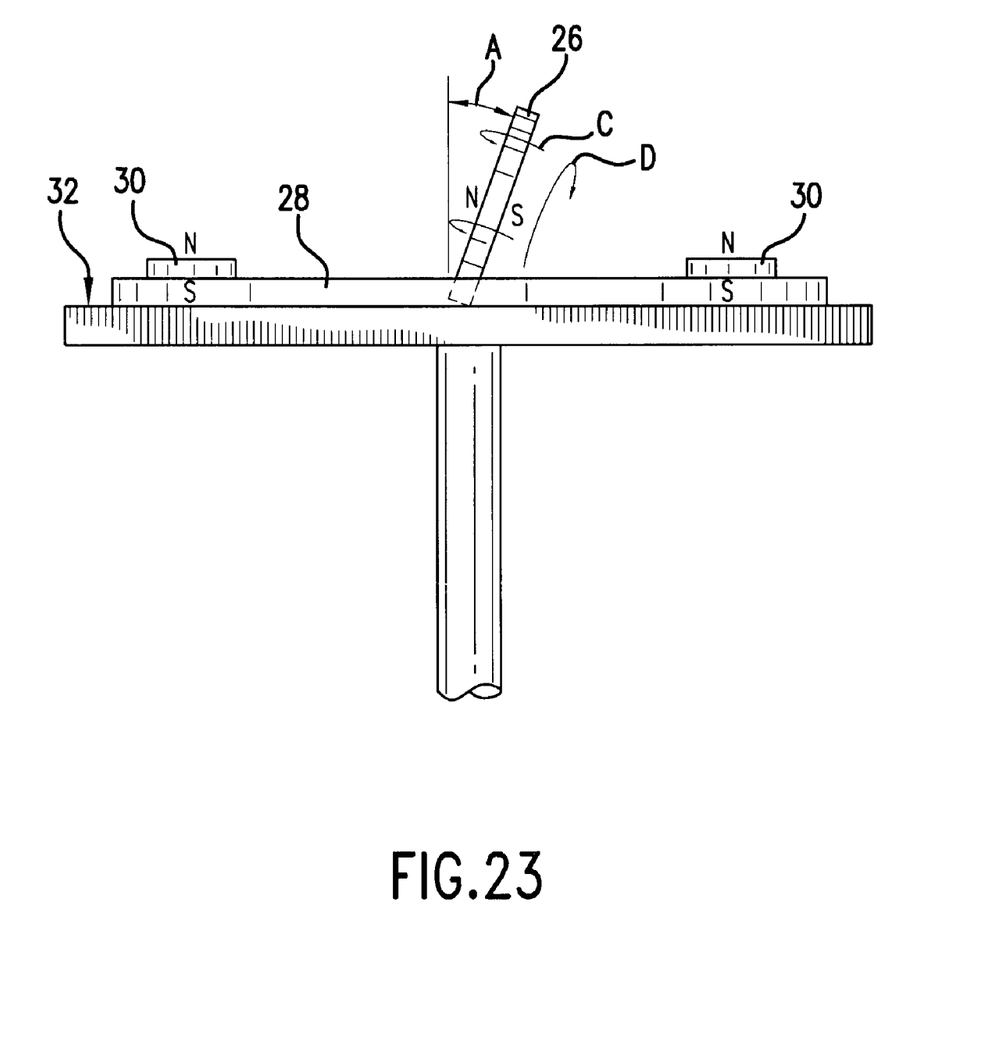

In another embodiment of the present invention as shown in FIG. 23, a capture ring may be attached to the surface 32, so that as the second magnet spins/rolls within the capture ring, the capture ring rotates with the surface 32. A shaft may be secured to the underside of the surface 32, so that it rotates in conjunction with the ring 28 and the surface 32. In this embodiment, it is not necessary to eliminate the roll of the second magnet in order to turn a shaft.

It is believed that, because the remote second magnet's volume, weight and magnetic field strength, coupled with its spin and roll, is so much larger in comparison to the first magnet, the second magnet's torque is sufficient to turn shafts of motors or be magnetically coupled to shafts of motors to perform work. It is also believed that the first magnet and the second magnet are able to be made as large as current technology permits, and still operate within the general parameters taught by the present invention. The present invention may be used in nano-technology, gyroscopes, electricity generation, flywheel technology and various toy configurations.

Other uses for the device may be observed by one skilled in particular arts therein twisting or rotating magnetic fields are utilized to power devices.

The first magnetic field that is rotated axially could be produced by known means for producing a magnetic field, such as by producing a magnetic field by electrical current.

What is claimed is:

1. A device for remotely spinning a magnet, comprising:
   a) a first magnetic field produced by a first magnet that is rotated axially; and
   b) a spinning remote magnet that that is positioned remotely from said first magnet and is positioned within the first magnetic field produced by the first magnet, wherein the spinning remote magnet spins about an axis of rotation of the spinning remote magnet in response to the axial rotation of the first magnet, and wherein the spinning remote magnet is held in free standing balance on its axis by the magnetic field produced by the first magnet as the spinning remote magnet spins about its axis on a surface, and the spinning remote magnet is held in position remotely and is held away from the first magnet by the axial rotation of the first magnet and the first magnetic field produced by axially rotating the first magnet and by the axial rotation of the spinning remote magnet.

2. A device for spinning a magnet as described in claim 1, wherein said first magnet has a north side on one side of an axis, and a south side on an opposite side of said axis, and wherein said first magnet is rotated axially about said axis.

3. A device for spinning a magnet as described in claim 1, wherein said remote magnet has a north side on one side of said axis about which said remote magnet spins, and a south side on an opposite side of said axis of said second remote magnet.

4. A device for spinning a magnet as described in claim 1, wherein said first magnet is rotated axially by a motor.

5. A device for spinning a magnet as described in claim 1, wherein said remote magnet is positioned within a ring, and wherein said ring comprises a magnet, and a magnetic field produced by said magnet of said ring further retains said remote magnet within said ring as said remote magnet spins.

6. A device for spinning a magnet as described in claim 1, wherein said remote magnet is positioned within a ring, and wherein said ring comprises a plurality of magnets and a magnetic field produced by said plurality of magnets of said ring further retains said remote magnet within said ring as said remote magnet spins.

7. A device for spinning a magnet as described in claim 1, wherein said axis about which the of first magnet rotates is oriented approximately 90 degrees from said axis about which said remote magnet spins.

8. A device for spinning a magnet as described in claim 1, wherein said remote magnet spins axially on a relatively flat surface in response to said first magnetic field as said first magnet is rotated axially.

9. A device for spinning a magnet as described in claim 1, further comprising a second remote magnet that spins in response to said first magnetic field as said first magnetic field is rotated axially while said remote magnet spins in response to said first magnetic field as said first magnetic field is rotated axially.

10. A device for spinning a magnet as described in claim 1, wherein the first magnetic field is produced by a plurality of magnets that are rotated axially and wherein the spinning remote magnet is held in balance on its axis as it spins about its axis and is held in position remotely from the first plurality of magnets by the axial rotation of the first plurality of magnets and the first magnetic field produced by axially rotating the first plurality of magnets.

11. A device for spinning a magnet as described in claim 1, further comprising a second remote magnet that is remote from said first magnet and said remote magnet, wherein said second remote magnet spins in response to spinning of said first magnet as said remote magnet spins in response to said first magnet as said first magnet is rotated axially.

12. A device for spinning a magnet as described in claim 1, wherein rotation of the first magnet produces a magnetic tether and said remote magnet is magnetically tethered to said first magnet by axial rotation of the first magnet to produce the magnetic tether in the first magnetic field, and movement of the remote magnet is controlled by the magnetic tethering.

13. A device for spinning a magnet as described in claim 1, wherein the remote magnet is a round disk, and the remote magnet rotates about an axis extending through a point on the circumference of the disk and a center of the disk, and said remote magnet further rotates about the circumference of the disk in response to the axial rotation of the first magnet.

14. A device for spinning a magnet as described in claim 1, wherein the axis about which the first magnet rotates is generally parallel to a plane upon which the remote magnet spins.

15. A device for spinning a magnet as described in claim 1, wherein the remote magnet spins on an axis of rotation that is at an angle that is less than ninety degrees relative to a plane of a surface upon which the remote magnet spins.

16. A device for spinning a magnet as described in claim 1, wherein the capture ring compromises a plurality of magnets positioned about a circumference thereof, and each of the magnets of the capture ring has the same pole as each of the other magnets of the capture ring positioned closest to the remote magnet, and a remaining pole each of the magnets of the capture ring is positioned opposite the first pole.

17. A device for spinning a magnet as described in claim 1, wherein a north pole of the first magnet is positioned opposite an axis of rotation of the first magnet from the south pole of the first magnet, and the axis of rotation is generally parallel to a plane upon which the remote magnet spins on its axis.

* * * * *